(12) United States Patent
Swanson et al.

(10) Patent No.: US 8,033,811 B2
(45) Date of Patent: Oct. 11, 2011

(54) PANTOGRAPH ASSEMBLY FOR DIGITAL MANUFACTURING SYSTEM

(75) Inventors: William J. Swanson, St. Paul, MN (US); Steven Scott Crump, Wayzata, MN (US)

(73) Assignee: Stratasys, Inc., Eden Prairie, MN (US)

( * ) Notice: Subject to any disclaimer, the term of this patent is extended or adjusted under 35 U.S.C. 154(b) by 568 days.

(21) Appl. No.: 12/180,140

(22) Filed: Jul. 25, 2008

(65) Prior Publication Data

US 2010/0021580 A1    Jan. 28, 2010

(51) Int. Cl.
*B28B 1/16* (2006.01)

(52) U.S. Cl. ......... 425/375; 264/308; 264/401; 264/113

(58) Field of Classification Search ................. 425/375; 264/113, 308, 401
See application file for complete search history.

(56) References Cited

U.S. PATENT DOCUMENTS

| | | | |
|---|---|---|---|
| 5,216,616 A * | 6/1993 | Masters | 264/401 |
| 5,503,785 A | 4/1996 | Crump et al. | |
| 5,633,021 A * | 5/1997 | Brown et al. | 425/375 |
| 5,740,051 A | 4/1998 | Sanders, Jr. | |
| 5,833,914 A * | 11/1998 | Kawaguchi | 264/400 |
| 5,968,561 A | 10/1999 | Batchelder et al. | |
| 6,022,207 A | 2/2000 | Dahlin et al. | |
| 6,406,658 B1 | 6/2002 | Manners et al. | |
| 6,722,872 B1 | 4/2004 | Swanson et al. | |
| 6,923,634 B2 | 8/2005 | Swanson et al. | |
| 7,077,638 B2 | 7/2006 | Leyden et al. | |
| 7,122,246 B2 | 10/2006 | Comb et al. | |
| 7,314,591 B2 | 1/2008 | Priedeman, Jr. | |
| 7,384,255 B2 | 6/2008 | LaBossiere et al. | |
| 2004/0005374 A1 * | 1/2004 | Narang et al. | 425/375 |
| 2007/0228590 A1 | 10/2007 | Labossiere et al. | |
| 2007/0228592 A1 | 10/2007 | Dunn et al. | |

FOREIGN PATENT DOCUMENTS

WO    2009/017739 A1    2/2009

OTHER PUBLICATIONS

International Search Report and Written Opinion of PCT/US2009/051243 filed Jul. 21, 2009.
Batchelder et al., Liquefier Assembly for Use in Extrusion-Based Digital Manufacturing Systems, U.S. Appl. No. 12/150,669, filed Apr. 30, 2008.
Leavitt, Extrusion Head for Use in Extrusion-Based Layered Deposition System, U.S. Appl. No. 11/888,076, filed Jul. 31, 2007.

* cited by examiner

*Primary Examiner* — Maria Veronica Ewald
(74) *Attorney, Agent, or Firm* — Brian R. Morrison; Westman, Champlin & Kelly, P.A.

(57) ABSTRACT

A digital manufacturing system for producing first and second objects comprises a platen, a gantry, a pantograph extrusion head system and first and second sets of extruders. The platen defines a workspace upon which the objects are produced. The gantry defines a headspace displaced from the workspace. The extrusion head system is mounted to the gantry for movement in the headspace. The sets of extruders are connected to the extrusion head system and are configured to deposit extrusion material on the workspace to build the objects. Each set of extruders comprises a first extruder mounted to the extrusion head system; a second extruder mounted to the extrusion head system so as to be actuatable from a first to a second position; and a flexible linkage connecting the extruders. The flexible linkages position the second extruders in approximately equal known spatial relationships to the first extruders in the second positions.

20 Claims, 9 Drawing Sheets

PANTOGRAPH ASSEMBLY FOR DIGITAL MANUFACTURING SYSTEM

BACKGROUND

The present invention relates to digital manufacturing (DM) systems, such as rapid prototyping and rapid manufacturing systems, that use various methods, such as fused deposition modeling, stereo-lithography, selective laser sintering, and similar techniques, for building three-dimensional (3D) objects. In particular, the present invention relates to extrusion based layered deposition systems for producing multiple, identical objects.

An extrusion based layered deposition system deposits a flowable build material to build a 3D solid object from a computer-aided design (CAD) model, typically in a rapid prototyping or manufacturing setting. Various such systems are described in U.S. Pat. Nos. 5,968,561 to Batchelder et al., 6,722,872 to Swanson et al. and 7,314,591 to Priedeman, Jr., all of which are assigned to Stratasys, Inc., Eden Prairie, Minn. The build material is heated and extruded through a first extrusion nozzle carried by an extrusion head, and is deposited in a layer-by-layer manner as a sequence of roads on a substrate in a planar (X, Y) surface. The extruded build material fuses to previously deposited build material, and solidifies upon a decrease in temperature. The position of the extrusion head relative to the substrate is then incremented perpendicularly to the planar surface in a Z-direction, and the process is repeated to form a 3D object resembling the CAD model.

In fabricating 3D objects by depositing layers of build material atop previously deposited build material, it is often necessary to fabricate a support for layers of build material larger than the previously deposited layers, which are not supported by the build material itself. Typically, a second extrusion nozzle deposits layers of a support material to build up a support utilizing a deposition process similar to that used for depositing the build material. The support material is formulated to adhere to the build material during deposition, and to easily separate from the solidified build material after the build process is completed. In order to prevent interference of the inactive extrusion nozzle with the active extrusion process, the second extrusion nozzle is often movable in the Z-direction relative to first extrusion nozzle. It is necessary to calibrate movement of the second extrusion nozzle such that its position when active is known and the position of the substrate can be properly adjusted in the Z-direction. Typically, the calibration is conducted manually by shimming the second extrusion nozzle after running the extrusion head through a series of test patterns. Such a method is, however, time consuming and not repeatable, but produces movement of the second extrusion nozzle within an acceptable tolerance limit for production of a single 3D object.

Movement of the extrusion head within the (X, Y) plane relative to the substrate, movement of the substrate in the Z-direction relative to the extrusion head, and movement of the extrusion nozzles in the Z-direction relative to each other are coordinated through a computer that manipulates drive systems for the extrusion head. The computer converts data representing the CAD model into build data that determines when to activate the build and support extrusion nozzles. The build data is obtained by dividing the CAD model of the 3D object into multiple horizontally sliced layers and determining the location of support structures. Then, for each sliced layer, the computer generates a build path for depositing roads of build material and support material on the substrate to form the 3D object and corresponding supports. As such, a single extrusion based layered deposition system is capable of rapidly producing a single 3D object with build data generated from a CAD model through carefully orchestrated movements of the extrusion head, substrate and extruders.

In order to produce multiple 3D objects that are identical, it is conventionally required to run the deposition process multiple times using the same build data. Thus, throughput of a single deposition system is limited by the length of each deposition process. In order to increase throughput, multiple extrusion based layered deposition systems can be employed, each operating with the same build data. In addition to high costs, such multi-machine deposition systems require large amounts of floor space and redundant components. Conversely, when only a single prototype object is needed, multiple deposition system machines lay idle while a single machine produces the object. Various DM systems include multiple means for forming extrusion material in order to more rapidly produce a single object. For example, U.S. Pat. No. 6,406,658 to Manners et al, which is assigned to 3D Systems, Inc., Valencia, Calif., describes a stereo-lithography system having a dual spot scanner for solidifying material for a single object. Likewise, U.S. Pat. No. 7,077,638 to Leyden et al, also assigned to 3D Systems, Inc., describes a 3D modeling system using a multi-orifice head for dispensing a single material for building and supporting a single object. There is, however, a need for further increasing throughput of DM systems, particularly extrusion based layered deposition systems.

SUMMARY

The present invention is directed to a digital manufacturing system for producing first and second replica three-dimensional objects. The digital manufacturing system comprises a platen, a gantry, an pantograph extrusion head system and first and second sets of extruders. The platen defines a planar workspace upon which the first and second three-dimensional objects are produced. The gantry defines a planar headspace disposed parallel to the workspace. The pantograph extrusion head system is mounted to the gantry for movement in the headspace. The first and second sets of extruders are connected to the pantograph extrusion head system and are configured to deposit extrusion material on the workspace to build the first and second three-dimensional objects, respectively. Each set of extruders comprises a first extruder mounted to the pantograph extrusion head system; a second extruder mounted to the pantograph extrusion head system so as to be actuatable relative to the workspace from a first to a second position; and a flexible linkage connecting the second extruder to the first extruder. The flexible linkages position the second extruders in approximately equal known spatial relationships to the first extruders in the second positions.

DETAILED DESCRIPTION

Figure 1:
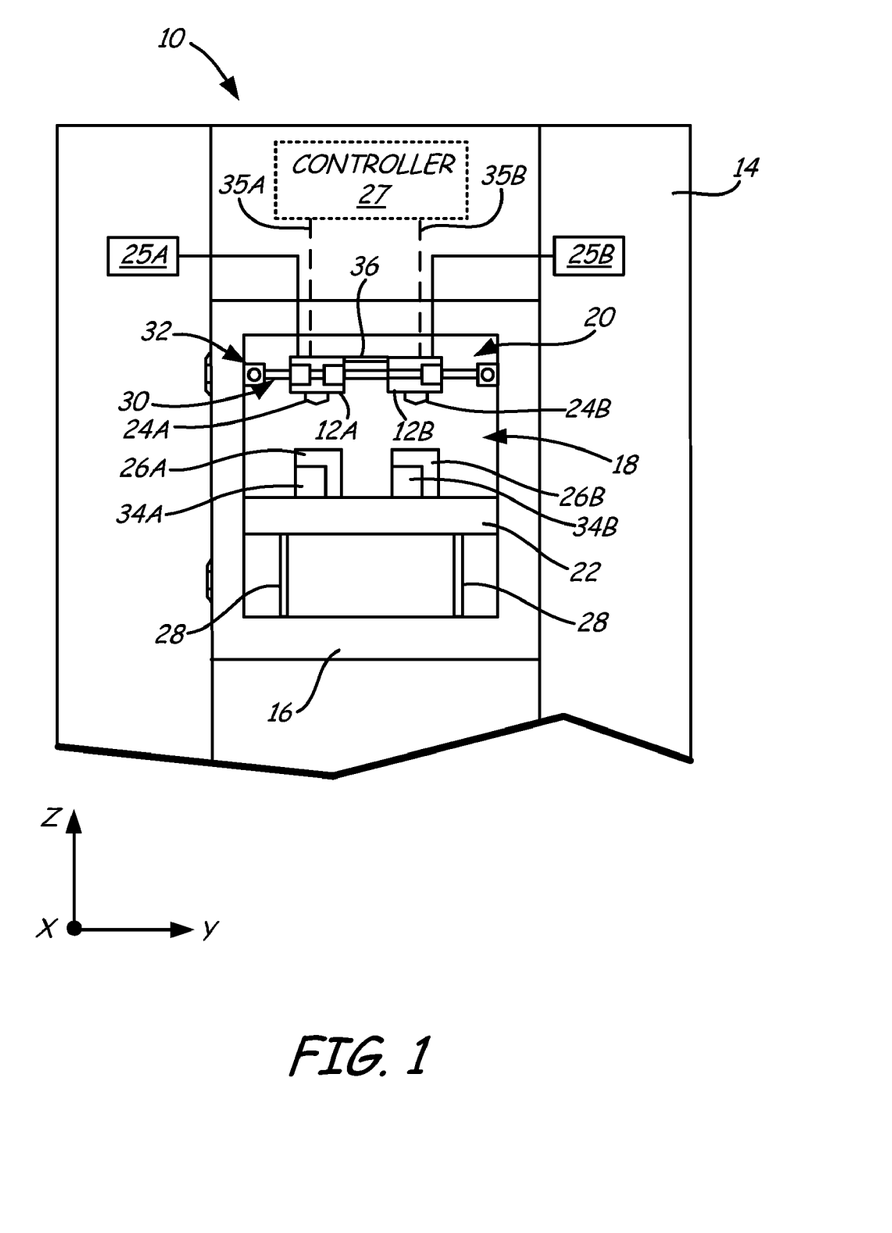
FIG. 1 is a front view of an extrusion based layered deposition system having a pantograph assembly for producing replica three-dimensional parts.

FIG. 1 is a front view of extrusion based layered deposition system 10 having dual deposition heads 12A and 12B of the pantograph assembly of the present invention. Deposition system 10 comprises cabinet 14 having door 16 that together enclose build chamber 18 in a suitable build environment. Deposition system 10 also includes gantry 20 and platen 22, which are disposed within build chamber 18 behind door 16. Suitable deposition systems for use with the present invention include fused deposition modeling systems developed by Stratasys, Inc., Eden Prairie, Minn. Deposition heads 12A and 12B include dual tip extruders 24A and 24B, respectively, which are configured to receive strands of extrusion material from filament load systems 25A and 25B. Controller 27 commands movement and controls operation of heads 12A and 12B and load systems 25A and 25B such that extruders 24A and 24B simultaneously deposit layers of extrusion material onto a substrate, such as platen 22, to build replica three-dimensional objects 26A and 26B.

Platen 22 and gantry 20 are configured to move deposition heads 12A and 12B in three-dimensional space, as defined by an (X, Y, Z) Cartesian coordinate system, relative to platen 22. Specifically, platen 22 includes lifters 28, such as electric motors and lead screws, that move platen 22 in a Z-direction orthogonal to an (X,Y) plane defined by gantry 20. Gantry 20 comprises a guide rail system having Y-bridge 30 and X-bridge 32 that define a headspace within which heads 12A and 12B move. Heads 12A and 12B move within the (X,Y) plane above platen 22 through a motorized drive system (not shown), as is known in the art. As such, gantry 20 and platen 22 give heads 12A and 12B vectored, high speed kinematic access to build space 18 above platen 22. Controller 27, which typically comprises a computer-operated system, coordinates operation of the motorized drive system and lifters 28 based on (X,Y,Z)-coordinate build data derived from the geometry of objects 26A and 26B. For example, build data is typically derived from a digital CAD model representing objects 26A and 26B. Using the build data, dual tip extruders 24A and 24B deposit incremental layers of material onto platen 22 to build 3D of objects 26A and 26B.

Objects 26A and 26B comprise replica parts, such as production manufacturing components or rapid prototypes, which often include complex geometries extending into space, as defined by the (X,Y, Z) Cartesian coordinate system. The geometries often result in deposited layers of the material being wider or laterally displaced in the (X, Y) plane than the previous layers such that the deposited layers are unsupported by the previous layers. As such, it is necessary to support the layers of material comprising objects 26A and 26B with supports 34A and 34B, respectively, so that subsequent layers of the extrusion material can be deposited. The supports are themselves comprised of layers of extrusion material deposited onto platen 22 by dual tip extruders 24A and 24B. The geometries of objects 26A and 26B and supports 34A and 34B are merely exemplary, and system 10 is suitable for building three-dimensional objects and support structures having a variety of different geometric designs. Filament load systems 25A and 25B include multiple filament feed spools that are configured to deliver multiple strands of build and support material to heads 12A and 12B, respectively, such as through a flexible feed tube. In various embodiments, filament load systems 25A and 25B comprise feed systems described and referenced in U.S. Pat. Nos. 6,923,634 to Swanson, et al. and 6,022,207 to Dahlin, et al., which are assigned to Stratasys, Inc., Eden Prairie, Minn. Deposition heads 12A and 12B include dual tip extruders 24A and 24B, respectively, which are configured to deposit the build material and the support material in planar (X, Y) layers to form replica objects 26A and 26B and supports 34A and 34B, respectively. Extruders 24A and 24B are supplied with similar build and support materials so extrusion head 12B deposits material with the same flow dynamics as extrusion head 12A. For example, the materials for extruders 24A and 24B should have similar thermal profiles such that the layers comprising objects 26A and 26B are built up in the same fashion. The materials, however, need not be identical so they can be, for example, different colors.

Heads 12A and 12B respectively include umbilical systems 35A and 35B, which provide independent electronic communication with controller 27 such as for providing power to heads 12A and 12B and operating extruders 24A and 24B. In the dual head embodiment shown in FIG. 1, head 12A is mechanically linked to head 12B with pantograph connector 36 in a trailer-like configuration. Controller 27 and the motorized drive system need only directly manipulate head 12A on gantry 20. Thus, heads 12A and 12B comprise a pantograph extrusion head system in which head 12A is an individually operable robot and connector 36 rigidly connects head 12B to head 12A such that movement of head 12A in the (X-Y) plane results in head 12B undergoing the same displacements in the (X-Y) plane. As such, controller 27 need only operate a single motorized drive system to manipulate both of heads 12A and 12B. In other pantograph extrusion head system embodiments, however, heads 12A and 12B each include motorized drive systems, such as two-dimensional linear stepper motors, and are independently operated by controller 27. In such an embodiment, however, particular attention must be given to developing collision avoidance rules to avoid interference between heads 12A and 12B. In yet another pantograph extrusion head system embodiment, multiple dual tip extruders are incorporated into a single head such that only a single motorized drive system is needed. The need for development of collision avoidance rules can be avoided in single motorized drive systems, such as in the single head embodiment and the dual head trailer embodiment shown in FIG. 1, however, by dividing platen 22 into distinct workspaces for extruders 24A and 24B, as is discussed in detail with reference to FIG. 2.

Figure 2:
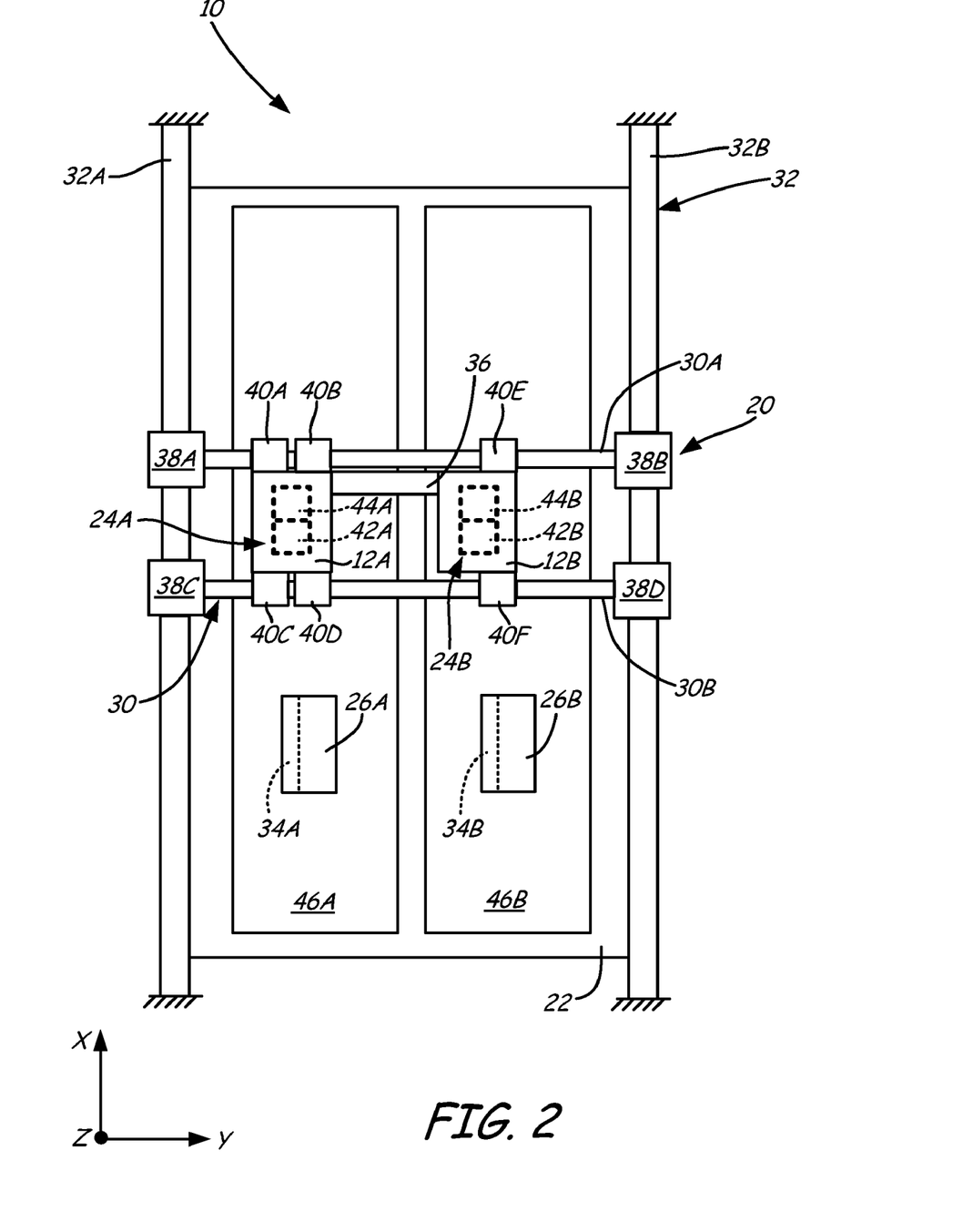
FIG. 2 is a top view of a gantry system having dual extrusion heads for use in the pantograph assembly of FIG. 1.

FIG. 2 is a top view of gantry 20 for use in extrusion based layered deposition system 10. Gantry 20 is displaced in the Z-direction above platen 22 to manipulate the pantograph assembly of heads 12A and 12B in the (X-Y) plane. Gantry 20 comprises Y-bridge 30, which comprises rails 30A and 30B, and X-bridge 32, which comprises rails 32A and 32B. Rails 32A and 32B of X-bridge 32 are fixed such that they are stationary inside build space 18 with respect to cabinet 14 (FIG. 1). Rails 30A and 30B of Y-bridge 30 are joined to rails 32A and 32B through bearings 38A-38D. Heads 12A and 12B are configured to ride on rails 30A and 30B through bearings 40A-40F. Heads 12A and 12B are linked by pantograph connector 36 and include dual tip extruders 24A and 24B, respectively. Dual tip extruder 24A includes stationary extruder 42A and movable extruder 44A, and dual tip extruder 24B includes stationary extruder 42B and movable extruder 44B. Platen 22 comprises a substrate partitioned into workspaces 46A and 46B upon which extruders 42A-44B are configured to deposit build and support materials. Heads 12A and 12B are connected in a pantograph assembly through their linkage with connector 36 and gantry 20 to build replica objects 26A and 26B, respectively, on workspace 46A and workspace 46B.

Workspaces 46A and 46B comprise zones of platen 22 within which heads 12A and 12B are configured to operate. More specifically, workspaces 46A and 46B comprise build areas to which extruders 42A and 44A, and 42B and 44B, respectively, have complete access without encumbrance from gantry 20 and the head to which they are not mounted. For example, workspace 46A comprises a "fenced" area through which extruders 42B and 44B will never pass during building of object 26A and support 34A. Although partitioning of platen 22 into distinct build zones restricts the size of parts that can be produced with system 10, workspaces 46A and 46B facilitate fitting of gantry 20 with both deposition head 12A and deposition head 12B. A typical extrusion based layered deposition system is designed having a build envelope, as defined by the size of build chamber 18, that would encompass ninety-five percent of the parts to be produced by a particular manufacturer. As such, most of the workspace defined by platen 22 is unused in the production of a typical single part. There is, therefore, space available on platen 22 for building additional parts.

Additionally, typical extrusion based layered deposition systems include a gantry system that is designed with stiffnesses, clearances and tolerances for positioning a variety of extrusion heads having varying masses. For example, the stiffnesses of the bridge rails, and the clearances between the bridge rails and the deposition heads are sized to accommodate much larger deposition heads than are often used in a particular system. Thus, a typical gantry is designed with significant margin in the mass that the drive system is capable of accurately positioning. There is, therefore, load capacity available on gantry 20 for supporting additional extrusion heads. Likewise, the drive system has capacity for moving additional mass.

In one embodiment of the invention, extrusion based layered deposition 10 utilizes the excess capacities of gantry 20, the motorized drive system and platen 22 to accommodate a second extrusion head that is connected through a pantograph assembly to build a second identical, or nearly identical, object on platen 22. In other embodiments, multiple pantograph extrusion heads can be added to gantry 20, depending on the size of the extrusion heads and the capacities of gantry 20 and the motorized drive system. Depending on the number of extrusion heads and the size of platen 22, the part sizes for each of the objects is limited such that no object will overlap or overhang the workspace for another object to ensure collision avoidance.

The pantograph assembly of the present invention can be easily incorporated as an upgrade to existing machines by connecting head 12B to an existing head with connector 36. For example, a typical extrusion head includes four bearings, positioned similarly to bearings 40A-40D shown in FIG. 2, to provide proper stability on rails 30A and 30B. Head 12B of the present invention need only include two bearings, bearings 40E and 40F, to provide stability when linked with head 12A through connector 36. Connector 36 thus needs to rigidly connect head 12B to head 12A to remove any slop between movement of head 12A and head 12B. Connector 36 comprises a rigid beam produced of any suitably stiff material and is connected to heads 12A and 12B by any suitable rigid connection. Connector 36, however, can also be configured to be expediently disconnected from heads 12A and 12B such that system 10 can convert easily between single and replica manufacturing. In such an embodiment, connector 36 is disconnected from head 12A such that head 12B can be parked on Y-bridge 30 in an out of the way position, such as near bearings 38B and 38D. Connector 36 is also disconnected from head 12B to avoid interference with movement of head 12A.

Furthermore, typical single head extrusion based layered deposition systems incorporate four filament feed spools: two for dispensing build material, and two for dispensing support material. An automatic change-over mechanism allows the second spool of each type to feed when the first is exhausted. When converting between single deposition head and dual deposition head replica manufacturing, the same four spools can feed the now four liquefiers without the automatic change-over option. In another embodiment, four additional spools are installed into the filament loading system. In an alternate embodiment, each of the four spools is co-wound with as many filaments as installed deposition heads, preferably in a zip-cord configuration, so that no additional spools are needed.

In embodiments where only replica manufacturing is to take place, head 12A and head 12B can each include two bearings to ride on rails 30A and 30B and connector 36 is semi-permanently attached to both heads. For example, in some embodiments, system 10 can be designed as a pantograph assembly with gantry 20, head 12A, head 12B and connector 36 custom designed for replica manufacturing, rather than as attachments or upgrades to existing single manufacturing systems.

In any dual deposition head system, whether an upgrade option or a dedicated replica manufacturing system, extrusion based layered deposition systems also include other system components for facilitating replica manufacturing. For example, system 10 includes additional purging and wiping systems. In one embodiment, one purge bucket and one tip wiper is located within build space 18 so that each deposition head has access. Such a system, however, has potential for violating collision avoidance rules. In an alternative embodiment, a tip wiper and purge bucket are themselves movable in build space 18 to avoid collision with extrusion heads 12A and 12B or objects 26A and 26B. In another embodiment, tip wipers and purge buckets are provided in build space 18 for each of heads 12A and 12B so that purging and tip wiping for nozzles 68A and 68B can be conducted in parallel.

Additionally, a typical extrusion based layered deposition system includes a thermal barrier system for isolating build space 18 from gantry 20. A typical thermal barrier system includes four sections of a flexible thermal barrier bellows that surround the extrusion head. Two flexible bellows provide separation of build space 18 for movement of the head in the Y-direction, and two flexible bellows provide separation of build space 18 for movement of the head in the X-direction. Such a system is illustrated in the aforementioned U.S. Pat.

No. 6,722,872. With the addition of an additional extrusion head, such as head 12B, a gap is produced in the bellows between the head. As such, a fifth, inflexible thermal barrier section is added between the heads.

In one application of an extrusion based layered deposition system including a replica extrusion head, the pantograph assembly is used to produce customized parts that have different features built on common platforms. First, the replica manufacturing heads produce in parallel the platform portions of customized parts that have common features. Second, the extrusion heads produce in series the customized features on the platform portions. The customized portions can be produced serially either by using both the first and second deposition heads, such as in a dedicated replica manufacturing system, or by using only the first deposition head, such as in an upgraded manufacturing system, after removing the replica deposition head.

Upon initiation of a build operation, extrusion heads 12A and 12B are positioned above workspace 46A and workspace 46B, respectively. Heads 12A and 12B are set to a build state in which dual tip extruders 24A and 24B are configured to deposit build material with extruders 42A and 42B. Extruders 42A and 42B deposit the build material in a sequence of roads to form a first, single layer for each of objects 26A and 26B. After the first layers of build material are completed, extrusion heads 12A and 12B are then toggled to a support state, which allows dual tip extruders 24A and 24B to deposit support material with extruders 44A and 44B. Extruders 44A and 44B deposit the support material in a sequence of roads to form a first, single layer for each of supports 34A and 34B upon which subsequent layers of build or support material will be deposited during the fabrication of objects 26A and 26B. Connector 36 tethers head 12B to head 12A so that head 12B mimics the movements of head 12A in the (X, Y) plane. As such, extruders 42B and 44B mimic the movements of extruders 42A and 44A to produce duplicate build and support layers for objects 26A and 26B. After the first layers of support material are completed, platen 22 is adjusted in the Z-direction such that subsequent layers of build and support material can be deposited atop the first layers.

Typically, platen 22 is lowered in the Z-direction, or brought further away from gantry 20, by lifters 28 (FIG. 1) such that the Z-direction distance between the first layers of deposited material and gantry 20 will be approximately equal to the distance between platen 22 and gantry 20 before the first layers of material were deposited. Thus, platen 22 is moved a distance equal to the thickness of a single layer of deposited material, which may vary from object to object depending on material and the part being produced. In other embodiments, gantry 20 can be configured to translate in the Z-direction, while platen 22 remains stationary within cabinet 14 (FIG. 1). While platen 22 adjusts the Z-direction relationship between gantry 20 and workspaces 46A and 46B, controller 27 (FIG. 1) adjusts the position of heads 12A and 12B to deposit subsequent layers of build and support material. Specifically, the drive system directly manipulates head 12A on gantry 24 to move dual tip extruder 14A in the (X, Y) plane based on the build data.

The layering process is repeated until each layer of objects 26A and 26B and supports 34A and 34B are completed. Upon completion of the deposition process, objects 26A and 26B are removed from build chamber 18. Supports 34A and 34B are typically adhered to objects 26A and 26B, respectively. Thus, the support material is selected to easily be pulled or broken away from the build material when properly solidified. After removal of the support material, finished object 26B will be identical, or nearly identical within acceptable tolerance limits, to finished object 26A due, in part, to the tethering effects of the pantograph assembly, including connector 36. To further ensure that object 26B will be a duplicate of object 26A, extruders 42A and 42B, and extruders 42B and 44B are provided with respective hinge mechanisms to replicate toggling of heads 12A and 12B between the build state and the support state.

Figure 3A:
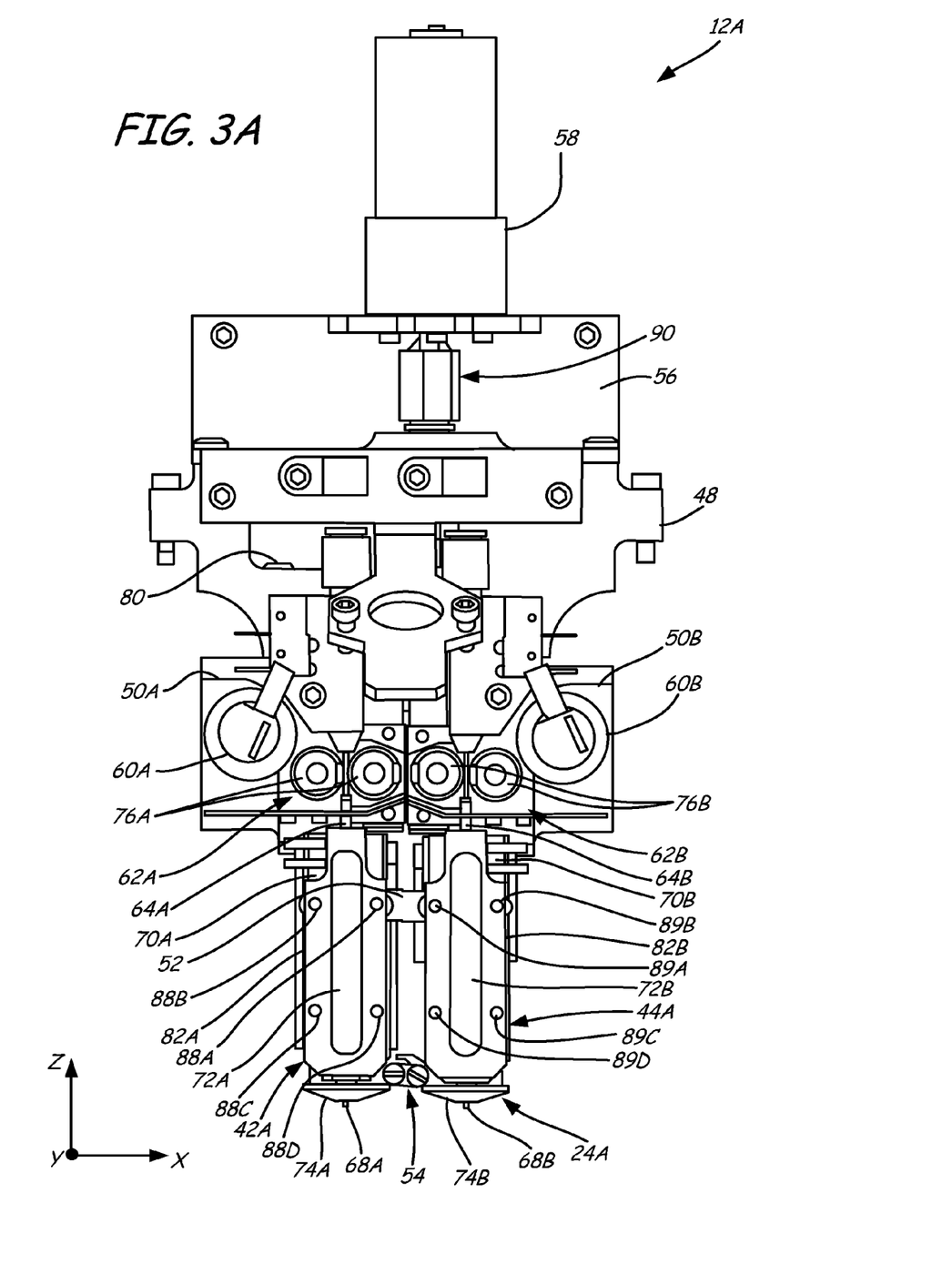
FIG. 3A is a front view of an extrusion head having a stationary extruder and a movable extruder connected by a hinge mechanism in the pantograph assembly of FIGS. 1 and 2.
Figure 3B:
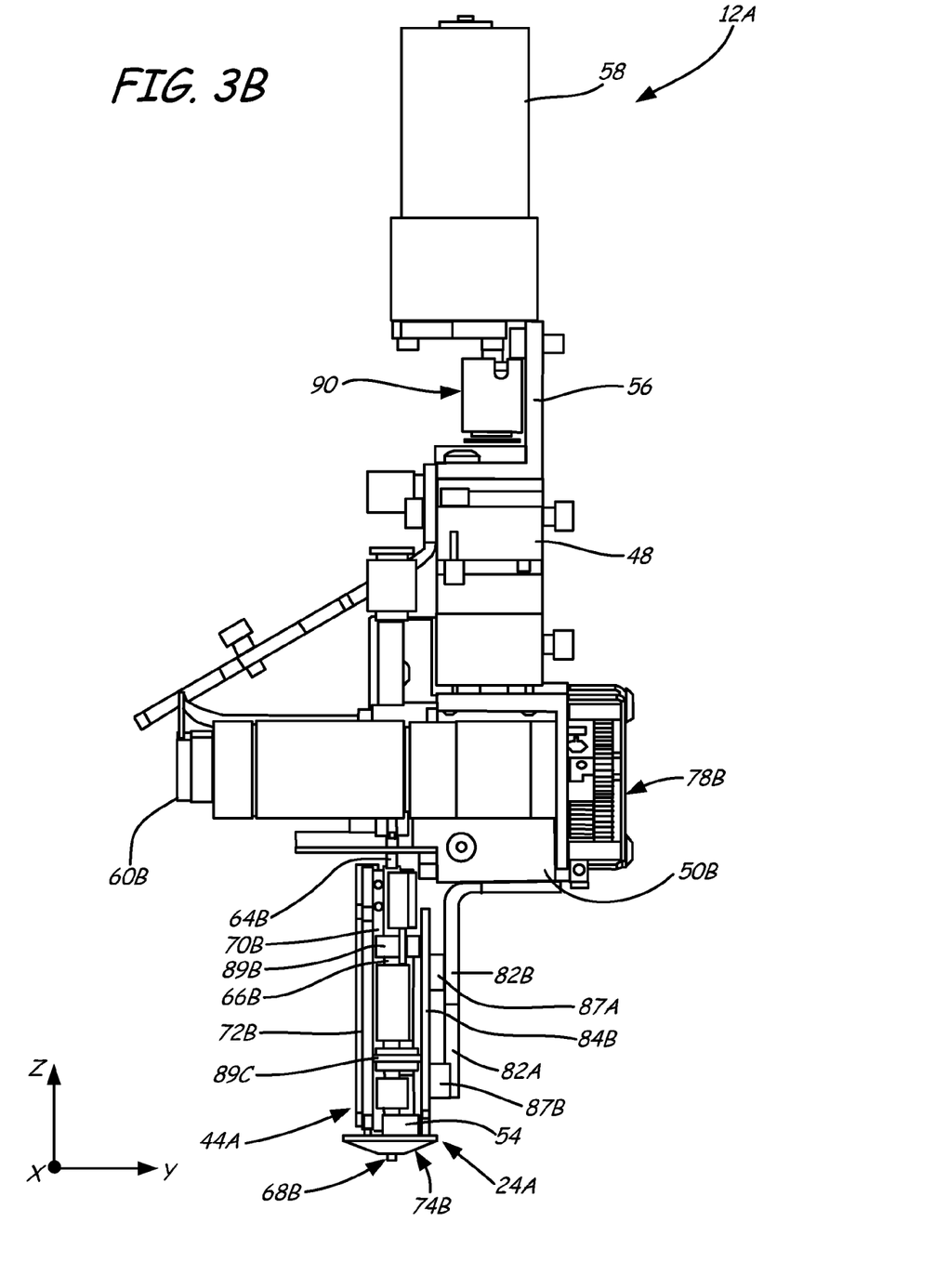
FIG. 3B is a side view of the extrusion head of FIG. 3A showing assembly of the movable extruder and an actuation motor.
Figure 3C:
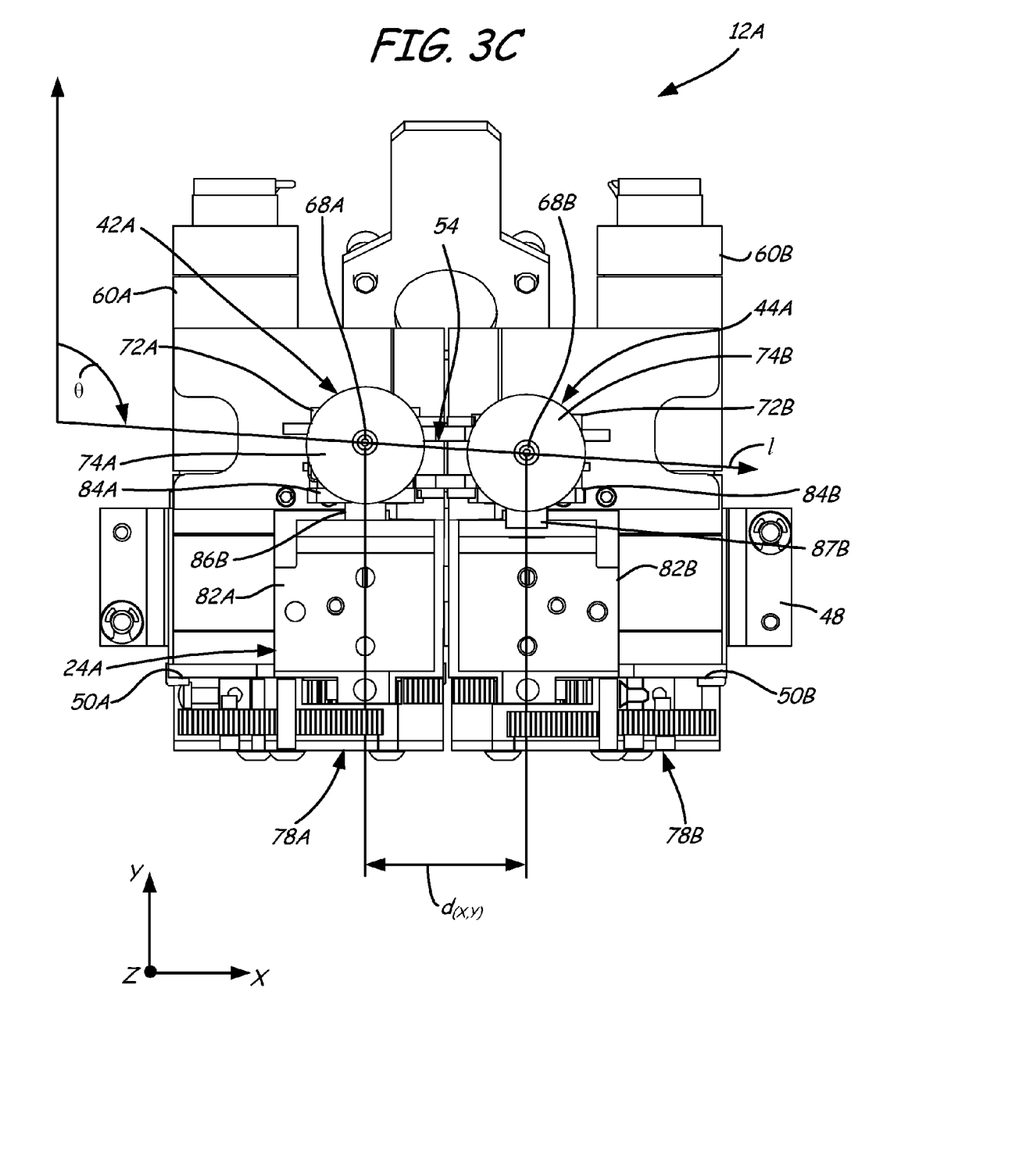
FIG. 3C is a bottom view of the extrusion head of FIG. 3A in which alignment of the movable extruder with the stationary extruder is shown.

FIG. 3A is a front view of extrusion head 12A having stationary extruder 42A and movable extruder 44A coupled to head body 48 for use in the pantograph assembly of FIGS. 1 and 2. FIG. 3B is a side view of extrusion head 12A of FIG. 3A. FIG. 3C is a bottom view of extrusion head 12A of FIG. 3A. FIGS. 3A-3C are discussed concurrently and show an extrusion head representative of both heads 12A and 12B. Head body 48 connects to stationary extruder block 50A and movable extruder block 50B, which is configured to toggle movable extruder 44A with respect to stationary extruder 42A between a build state and a support state. Head 12A is provided with a pair of linkages that facilitate toggling of movable extruder 44A. Connector 52 comprises a rigid linkage that maintains the upper end of movable extruder 44A spaced from stationary extruder 42A in the X-direction. Hinge mechanism 54 comprises a flexible linkage that constrains three-dimensional movement of extruder 44A such that the displacement of movable extruder 44A can be replicated in head 12B (FIG. 2). Head 12A also includes motor bracket 56, extruder motor 58, stationary feed motor 60A, movable feed motor 60B, stationary feed system 62A and movable feed system 62B. Head body 48 comprises a base block upon which the components of head 12A are mounted, and is mounted to Y-bridge 30 with bearings 40A-40D (FIG. 2). Head body 48 thus does not move in the Z-direction with respect to Y-bridge 30 or gantry 20, but rather translates in the (X, Y) plane within the headspace.

In the embodiment shown, stationary extruder 42A is configured to extrude build material for fabricating object 26A, while movable extruder 44A is configured to extrude support material for fabricating support 34A. While the materials herein are discussed as being build materials and support materials, suitable materials for use with the present invention include any type of extrudable material (e.g., thermoplastic materials). Suitable build and support materials for use with the present invention are described in U.S. Pat. No. 7,122,246 to Comb et al., which is assigned to Stratasys, Inc. The build material and support material are different from each other in that they have different thermal profiles in order to, for example, be easily separated after solidification. Thus, movable extruder 44A is spatially and thermally separated from stationary extruder 42A. As best shown in FIG. 3B, movable extruder 44A comprises liquefier tube 64B, which extends through and is brazed to liquefier block 66B. Extrusion nozzle 68B is positioned at an end of liquefier tube 64B to dispense material from extruder 44A. Heater 70B, which in one embodiment comprises a ceramic heater, extends the length of liquefier block 66B to melt or liquefy support material within liquefier tube 64B. Movable extruder 44A also includes cover plate 72B, which acts as a heat shield to prevent heat from escaping liquefier block 66B, and nozzle shield 74B, which comprises a TEFLON® shield from which accumulated extrusion material is easily removed. Cover plate 72B and nozzle shield 74B also prevent burning or melting of already deposited material. Stationary extruder 42A includes similar components, such as liquefier tube 64A, extrusion nozzle 68A, heater 70A, cover plate 72A and nozzle shield 74A. Further explanation of liquefier tubes and heaters suitable for use in the present invention is provided in U.S.

patent application Ser. No. 12/150,669 to Batchelder, et al., which is assigned to Stratasys, Inc.

Feed system 62A and feed system 62B are configured to deliver continuous filament strands or a series of filament segments of extrusion material to liquefier tubes 64A and 64B. For example, movable feed system 62B includes wheels 76B, between which a filament is pushed into liquefier tube 64B. Wheels 76B are driven by gear system 78B, which is powered by movable feed motor 60B. Stationary extruder 42A includes similar components, such as wheels 76A and gear system 78A. Feed motors 60A and 60B each also include a position encoder, a driver and a feedback loop with controller 27 (FIG. 1), respectively. The extrusion rate of head 12A is balanced to that of head 12B (FIG. 2) with reference to different time constants for each of extruders 42A-44B. Thus, the overall kinematics of motors 60A and 60B and extruders 42A and 44A in both heads are adjusted to the time constant of the slowest extruder.

Extrusion material from loading systems 25A and 25B (FIG. 1) is fed into liquefier tubes 64A and 64B with mechanical force by wheels 76A and 76B. Solid filament enters liquefier tubes 64A and 64B at one end, is melted by heaters 70A and 70B, and is extruded through nozzles 68A and 68B as liquefied material. Thus, extruders 44A and 44B require thermal gradients to produce melted extrusion material. Heated material is needed near nozzles 68A and 68B, while cooled material is needed near wheels 76A and 76B. Thus, heat is removed from extruders 42A and 42B near wheels 76A and 76B with near-room-temperature air supplied to extrusion head 12A by a flexible bellows tube. Each additional deposition head, such as head 12B, includes a similarly positioned bellows tube. In another embodiment, heads 12A and 12B are provided with thermoelectrics to electrically pump heat away from the cool end of extruders 44A and 44B to a convector, which is then cooled by circulating heated ambient air of the build chamber by the convector. Thus, each extruder 44A and 44B includes a temperature sensor for providing temperature control feedback to controller 27. Further explanation of feed systems suitable for use in the present invention is provided in U.S. Pat. No. 7,384,255 to LaBossiere, et al., which is assigned to Stratasys, Inc. Extruders 42A and 44A are configured to deliver liquefied build and support material to platen 22 (FIG. 2) to build up objects 26A and 26B and supports 34A and 34B. In order to avoid interference of extruders 42A and 44A with previously deposited layers, head 12A is configured to be adjusted between a build state and a support state, where extruder 42A deposits build material for object 26A in the build state and extruder 44A deposits support material for support 34A in the support state.

Stationary extruder block 50A is directly coupled to head body 48 with, for example, threaded fasteners extending through stationary extruder block 50A at opening 80. Stationary extruder 42A is coupled to extruder block 50A with angle bracket 82A. Angle bracket 82A is joined to back plate 84A with studs 86A and 86B (positioned behind studs 87A and 87B in FIG. 3B and shown in FIG. 6). Standoffs 88A-88D join back plate 84A with cover plate 72A, between which is positioned liquefier block 66A and heater 70A. As such, stationary extruder 42A is rigidly connected to head body 48 and thus moves where head body 48 moves. Specifically, stationary extruder 42A is stationary in the Z-direction with respect to gantry 20. Movable extruder block 50B is coupled to head body 48 through extruder motor 58 and jack assembly 90. Jack assembly 90 includes a threaded screw (not shown) that is driven by motor 58. The threaded screw extends through head body 48 at opening 80 to engage movable extruder block 50B. Extruder block 50B also includes a bearing shaft (not shown) that extends into a bore in head body 48. As such, movable extruder block 50B is configured to translate linearly in the Z-direction relative to head body 48 and gantry 20. Movable extruder 44A is coupled to extruder block 50B with angle bracket 82B. Angle bracket 82B is joined to back plate 84B with studs 87A and 87B. Standoffs 89A-89D join back plate 84B with cover plate 72B, between which is positioned liquefier block 66B and heater 70B. As such, movable extruder translates in the Z-direction with extruder block 50B. Further explanation of extruder blocks suitable for use with the present invention is provided in U.S. patent application Ser. No. 11/888,076 to Leavitt, which is assigned to Stratasys, Inc.

Manipulation of movable extruder body 50B by extruder motor 58 is coordinated by controller 27 (FIG. 1) in conjunction with actuation of platen 22 (FIG. 1) by lifters 28. When head 12A toggles between the build state and the support state, movable extruder body 50B is actuated in the Z-direction to extend movable nozzle 68B beyond stationary nozzle 68A. As such, movable nozzle 68B also becomes positioned closer to platen 22 than stationary nozzle 68A. Platen 22 must be translated in the Z-direction an amount equal to the distance nozzle 68B is positioned below nozzle 68A so that the support material deposited by nozzle 68B is deposited in the same plane, with respect to platen 22, as the build material is deposited by nozzle 68A of stationary extruder 42A. It is desirable to be able to consistently actuate movable extruder body 50B in the Z-direction so that platen 22 can be adjusted commensurately with movement of nozzle 68B. Furthermore, in replica manufacturing where two heads are producing two identical parts, it is also desirable to replicate the movement of movable extruder 44B (FIG. 2) of head 12B with the movement of movable extruder 44A of head 12A such that objects 26A and 26B will be built up in the same manner. To decrease variations between parts 26A and 26B, the ability of controller 27 to know the positions of nozzles 68A and 68B on both of heads 12A and 12B needs to be increased so that the positioning of the active nozzle and the position of platen 22 can be better coordinated. Although some difference in the Z-direction distance between platen 22 and each of head 12A and head 12B is acceptable due to the ability of initial support layers to absorb variations, the difference in Z-direction distance between the active nozzle on each head in the build and support states and platen 22 should be very nearly the same. In other words, extruder 42A and extruder 44A should be the same distance above platen 22 when active, which may be slightly different than the distance extruders 42B and 44B are above platen 22 when active. Thus, it is desirable to know that the position of nozzles 68B on both heads 12A and 12B will be moved into a known spatial relationship with respect to nozzles 68A, and that those spatial relationships are identical or nearly so. Hinge mechanism 54 connects nozzle 68A with nozzle 68B on each head to maintain the spatial relationships between the nozzles within a small tolerance range that is acceptable for the given objects 26A and 26B being produced.

As shown in FIG. 3A, deposition head 12A is provided with connector 52 and hinge mechanism 54 to guide toggling of movable extruder 44A between the build state and the support state. Connector 52 comprises a pinned connector that is allowed to pivot on stationary extruder 42A and movable extruder 44A at standoffs 88A and 89A. Connector 52 is loosely pinned such that connector 52 provides coarse alignment of movable extruder 44A with stationary extruder 42A. Connector 52 maintains extruder 44A in an upright position and aligns liquefier tube 64A with wheels 76A of feed system 62A to facilitate feeding of extrusion material filaments.

Hinge mechanism 54, however, provides fine alignment of movable extruder 44A with stationary extruder 42A such that the spatial relationship between nozzle 68A and 68B in the support state is known and replicable. Specifically, hinge mechanism 54 assists in maintaining nozzle 68B in a known position with respect to nozzle 68A for three parameters: a distance $d_{(X,Y)}$ between the nozzles in the (X, Y) plane (FIG. 3C), an angle ∅ of a line extending through the nozzles with respect to gantry 20 (FIG. 3C), and a distance $d_{(Z)}$ between the tips of the nozzles with respect to the Z-direction (FIG. 4).

FIG. 3C illustrates the relationship of nozzles 68A and 68B with reference to distance $d_{(X,Y)}$ and angle ∅. Distance $d_{(X,Y)}$ represents the absolute distance between nozzle 68A and nozzle 68B in the (X, Y) plane, without reference to the heights of nozzles 68A and 68B in the Z-direction, or the orientation of extruder 24A in the (X, Y) plane. Distance $d_{(X,Y)}$ thus comprises a vector typically having a substantial X-direction component and a minor Y-direction component. Angle ∅ represents the orientation of extruder 24A and nozzles 68A and 68B in the (X,Y) plane with respect to gantry 20 (FIG. 2). For example, gantry 20 is positioned above platen 22 such that Y-Bridge 30 and X-bridge 32 are orthogonal to each other and the Z-direction. Thus, the X-axis extends generally parallel to X-bridge 30. Line l extends through the centers of nozzles 68A and 68B at angle ∅ with respect to the reference X-direction axis. Angle ∅ comprises an indication of how far in the Y-direction nozzle 68B is offset from nozzle 68A.

Figure 4:
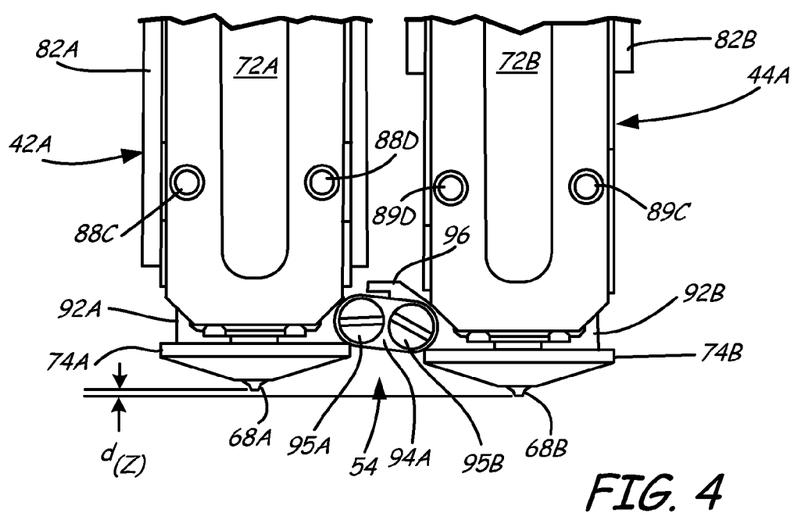
FIG. 4 is a front view of a stationary extruder and a movable extruder connected by a hinge mechanism used in the extrusion head of FIGS. 3A-3C.

FIG. 4 is a front view of stationary extruder 42A and movable extruder 44A connected by hinge mechanism 54. FIG. 4 illustrates the relationship of stationary nozzle 68A and movable nozzle 68B with reference to distance $d_{(Z)}$. Extruders 42A and 44A are suspended from extruder blocks 50A and 50B (FIG. 3A) by angle brackets 82A and 82B, respectively. Liquefier tubes 64A and 64B (FIG. 3A) extend through extruders 42A and 42B behind cover plates 72A and 72B and up to nozzles 68A and 68B, respectively. Nozzles 68A and 68B extend through nozzle shields 74A and 74B, respectively, such that their tips form the downward-most extent of extruders 42A and 44A in the Z-direction. FIG. 4 shows movable extruder 44A in an arbitrary position between the build state and the support state. In the support state, movable extruder 44A is positioned in a lower position such that nozzle 68B is below nozzle 68A and distance $d_{(Z)}$ has a positive value. In the build state, movable extruder 44A is positioned in an upper position such that nozzle 68B is above nozzle 68A and distance $d_{(Z)}$ has a negative value. Hinge mechanism 54 ensures that every time movable extruder 44A is fully positioned in the build state, distance $d_{(Z)}$ is the same to within an acceptable tolerance. In one embodiment, hinge mechanism 54 ensures that movable nozzle 68B is positioned below stationary nozzle 68A a distance $d_{(Z)}$ to within a tolerance of approximately 0.001 inches (~0.025 mm) in the support state. Hinge mechanism 54, which is discussed in greater detail with reference to FIGS. 5 and 6, comprises stationary yoke 92A, movable yoke 92B, link 94A, fasteners 95A and 95B, and interference feature 96.

Figure 5:
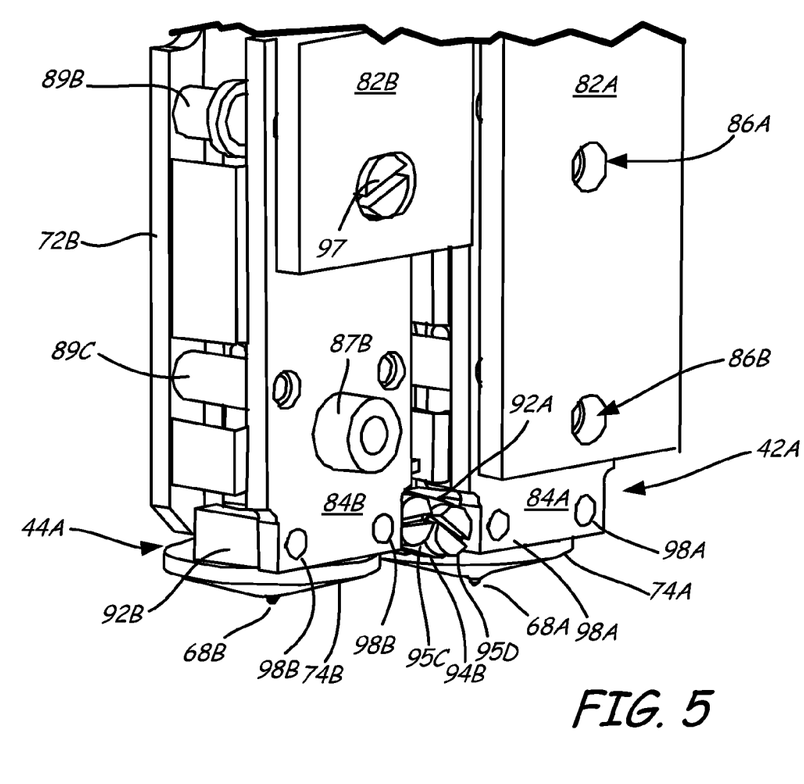
FIG. 5 is a rear perspective view of the stationary extruder and the movable extruder of FIG. 4 showing assembly of the hinge mechanism and the extrusion head.

FIG. 5 is a rear perspective view of stationary extruder 42A and movable extruder 44A of FIG. 4 showing assembly of hinge mechanism 54 with back plates 84A and 84B. Hinge mechanism 54 comprises stationary yoke 92A, movable yoke 92B, link 94B and fasteners 95C and 95D. Back plates 84A and 84B are connected to angle brackets 82A and 82B, respectively. As discussed with reference to FIGS. 3A-3C, angle bracket 82A is fixedly attached to extruder block 50A such that nozzle 42A is three-dimensionally stabilized, and angle bracket 82B is adjustably attached to extruder block 50B through jack assembly 90, which does not provide three-dimensional stability to movable extruder 44A. Fastener 97, which is connected to stud 87A (not shown) connects back plate 84B to angle bracket 82B, and thus provides the actuating force for movement of extruder 44A in the Z-direction. Fastener 97 does not, however, stabilize plate 84B. For example, the Z-direction position, or distance $d_{(Z)}$, of plate 84B is dictated by the precision with which jack assembly 90 (FIG. 3A) is able to adjust extruder block 50B (FIG. 3A). Additionally, fastener 97 permits plate 84B to rotate against angle bracket 82B such that the distance between nozzle 68B and nozzle 68A, or distance $d_{(X,Y)}$, is not stabilized. Movable extruder 44A is stabilized by connector 52 (FIG. 3A) and hinge mechanism 54.

Connector 52 provides rotational stability to an upper portion of plate 84B, while hinge mechanism 54 provides further restraint on movement of back plate 84B and nozzle 68B. Stationary yoke 92A is connected to back plate 84A with, for example, threaded fasteners at bores 98A. Likewise, movable yoke 92B is connected to back plate 84B with, for example, threaded fasteners at bores 98B. Yokes 92A and 92B are substantially parallel to the bottom surfaces of plates 84A and 84B such that yokes 92A and 92B are orthogonal to the Z-direction. Yokes 92A and 92B extend perpendicularly from plates 84A and 84B to receive nozzles 68A and 68B. Yokes 92A and 92B are connected by link 94A and fasteners 95A and 95B (FIG. 4), and link 94B and fasteners 95C and 95D (FIG. 5). Yokes 92A and 92B, and links 94A and 94B assemble to form a double action hinge that, with the addition of interference feature 96, stabilizes the position of nozzle 68B in the build state of head 12A.

Figure 6:
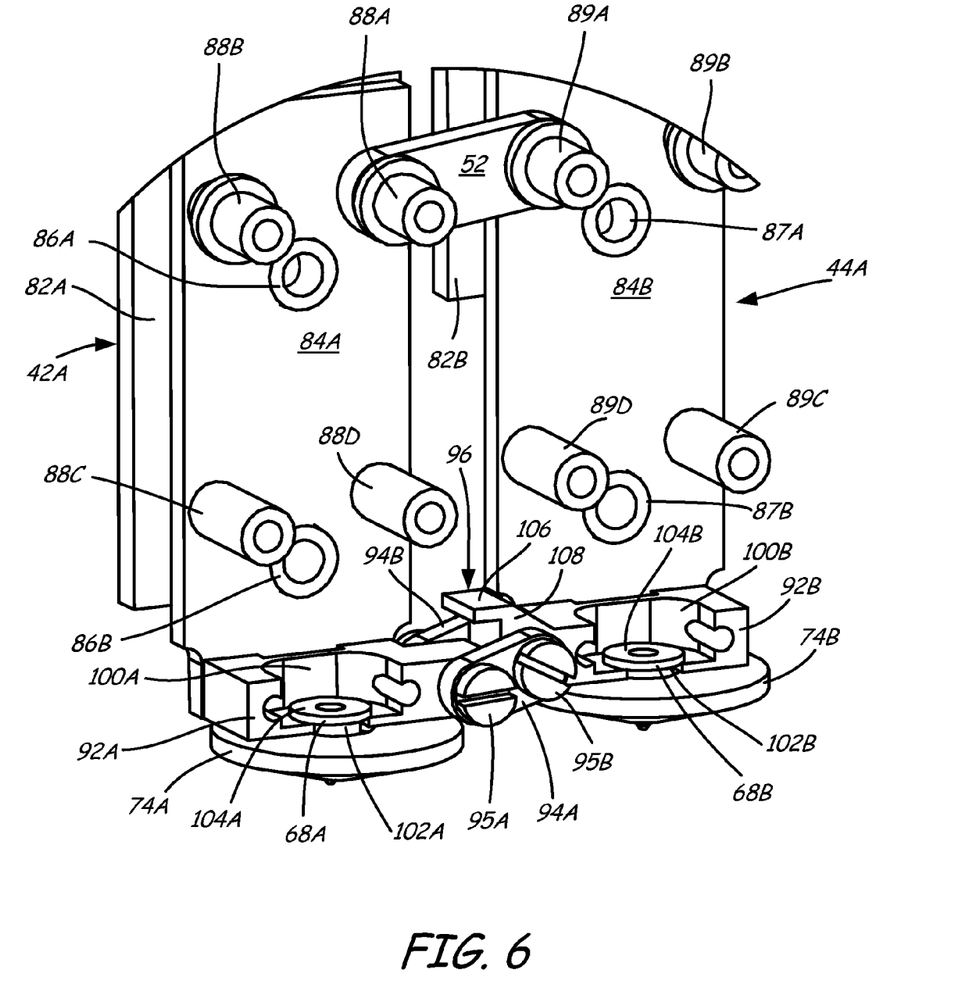
FIG. 6 is a front perspective view of the hinge mechanism of FIG. 4 shown with components of the stationary and movable extruders omitted such that a top of the hinge mechanism is visible.

FIG. 6 is a front perspective view of hinge mechanism 54 of FIG. 4 shown with cover plates, liquefier blocks, and liquefier tubes omitted such that top surfaces of stationary yoke 92A and movable yoke 92B are visible. Hinge mechanism 54 includes links 94A and 94B, fasteners 95A and 95B, interference feature 96, and nozzle pockets 100A and 100B. Back plate 84A is connected to angle bracket 82A through studs 86A and 86B such that stationary extruder 42A is stationary in the Z-direction. Back plate 84B is connected to angle bracket 82B through stud 87A such that movable extruder 44A is adjustable in the Z-direction. Movable extruder 44A is connected to stationary extruder 42A with connector 52 and hinge mechanism 54. Connector 52 pivots about standoffs 88A and 89A at upper portions of back plates 84A and 84B to maintain movable extruder 44A in an upright position and spaced from stationary extruder 42A. Movable nozzle 68B is maintained in a known spatial relationship with respect to stationary nozzle 68A through hinge mechanism 54.

Stationary yoke 92A and movable yoke 92B are rigidly connected to back plates 84A and 84B, respectively, and provide shelves for receiving nozzles 68A and 68B. Specifically, nozzle pockets 100A and 100B are recessed into yokes 92A and 92B, respectively, to allow liquefier blocks 66A and 66B to be secured within yokes 92A and 92B. Pockets 100A and 100B include bores 102A and 102B for receiving nozzles 68A and 68B. Nozzles 68A and 68B fit snuggly within bores 102A and 102B while flanges 104A and 104B prevent nozzles from passing through yokes 92A and 92B. Nozzles 68A and 68B comprise orifii that receive extrusion materials from liquefier tubes 64A and 64B to regulate dispensing of the material. Nozzles 68A and 68B are typically necked down at their tips so that the extrusion material can be dispensed during an extrusion operation in beads or roads of a diameter smaller than the diameter of tubes 64A and 64B.

During an extrusion operation, such as in the build state, stationary nozzle 68A is held generally orthogonally above platen 22 (FIG. 1) by the relative parallel relationship between stationary yoke 92A and platen 22. As such, stationary extruder 42A deposits roads of build material perpendicularly to platen 22. During such an operation, movable extruder 44A is retracted such that nozzle 68B is positioned above nozzle 68A in the Z-direction. When in the build state, a side surface of movable yoke 92A comes to rest against a side surface of stationary plate 92. In the build state, it is not necessary for nozzle 68B to be positioned precisely above nozzle 68A because it is not actively depositing extrusion material onto platen 22. Nozzle 68B, as well as all of extruder 44A, need only be positioned out of the way of nozzle 68A so as to not interfere with the active extrusion process. In the support state, however, as discussed above, nozzle 68B is positioned precisely below nozzle 68A using interference feature 96.

During transition from the build state to the support state, angle bracket 82B is lowered by jack assembly 90 (FIG. 1). Movable nozzle is lowered toward platen 22 and is held generally perpendicularly above platen 22 by the relative parallel relationship between movable yoke 92B and platen 22. Due to the double action hinge provided by links 94A and 94B, movable yoke 92B is maintained generally parallel to platen 22 throughout the transition process. In another embodiment, links 94A and 94B are replaced with linkages comprising segments of flexible spring steel. In any embodiment, however, movable yoke 92B is permitted to translate parallel to platen 22. Links 94A and 94B also guide movable yoke 92B along an arcuate trajectory while being lowered, the radius of which is dictated by the length of links 94A and 94B. In the support state, when movable yoke 92B is fully translated in the Z-direction, flange 106 of interference feature 96 engages stationary yoke 92A to stop further movement of nozzle 68B in the Z-direction. Flange 106 is displaced in the Z-direction from movable plate 92B by pedestal 108 such that movable plate 92B is positioned lower than stationary plate 92A. Furthermore, links 94A and 94B prevent movable plate 92B from moving closer to stationary plate 92A in the (X, Y) plane.

Figure 7:
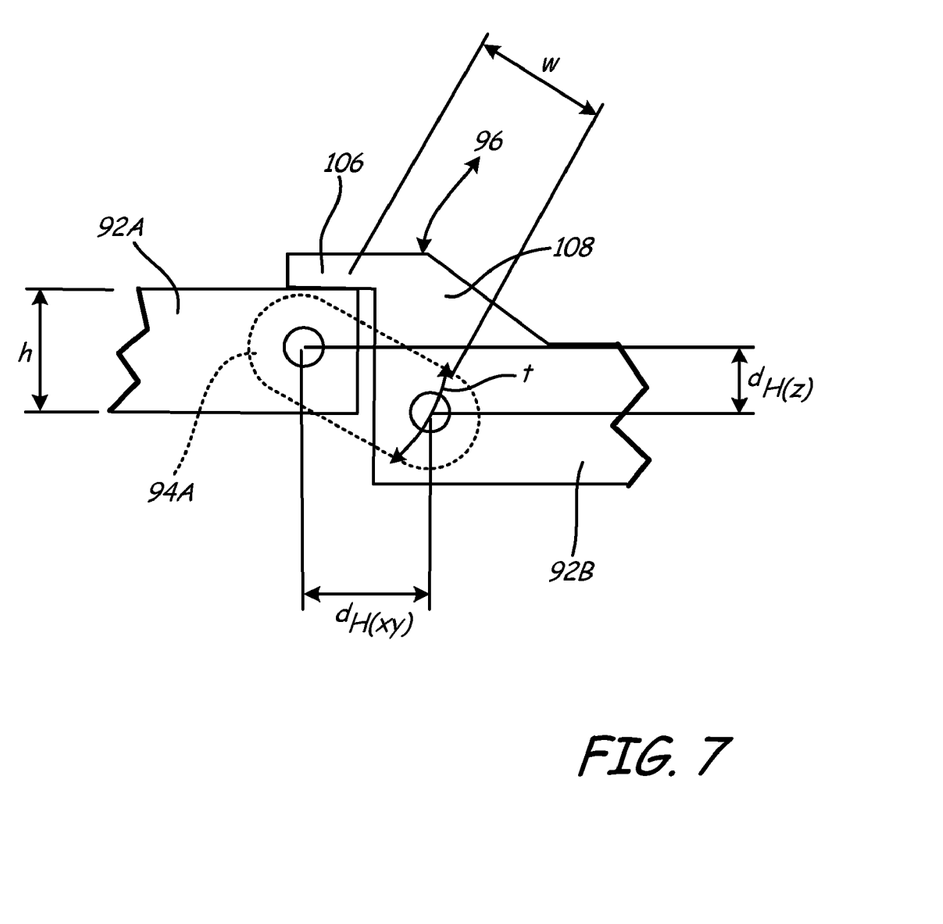
FIG. 7 is a diagrammatic side view of the hinge mechanism of FIG. 6 showing interaction of an interference feature with the hinge mechanism to limit movement of the moveable extruder.

FIG. 7 is a diagrammatic side view of hinge mechanism 54 of FIG. 6 showing interaction of interference feature 96 with stationary yoke 92A to inhibit movement of movable yoke 92B. Link 94A is shown in phantom in FIG. 7 and fasteners 95A and 95B are omitted to show more clearly interference feature 96. Interference feature 96 comprises planar flange 106 that is displaced from movable yoke 92B by pedestal 108. Pedestal 108 projects from movable yoke 92B in the in the Z-direction. Pedestal 108 is positioned on movable yoke 92B along a side adjacent stationary yoke 92A. Flange 106 projects from pedestal 108 in the (X, Y) plane so as to extend above stationary yoke 92A. In the support state, a bottom surface of flange 106 engages a top surface of stationary yoke 92A. By engaging stationary plate 92A, flange 106 interferes with the capacity of movable yoke 92B to translate downward in the Z-direction. Thus, in an embodiment where yokes 92A and 92B are symmetrical (but for interference feature 96), movable yoke 92B is limited in moving below stationary yoke 92A the distance between the bottom surface of flange 106 and the top surface of yoke 92B. As such, the hinge distance $d_{H(Z)}$ to which movable yoke 92B moves beneath stationary yoke 92A, or the Z-direction distance between the centers of yokes 92A and 92B is equivalent to distance $d_{(Z)}$ between nozzles 68A and 68B (FIG. 4). Interference feature 96 thus replaces the need for measuring distance $d_{(Z)}$ and placing shims within extruder 44A or head 12A to fix distance $d_{(Z)}$.

Hinge mechanism 54 also fixes distance $d_{(X, Y)}$ between nozzles 68A and 68B (FIG. 3C) through engagement of interference feature 96 with yoke 92A in the support state. When yoke 92A and 92B are coplanar, the hinge distance $d_{H(X,Y)}$ between yokes 92A and 92B is greatest. From such a position, arcuate trajectory t of movable yoke 92B, which is dictated by link 94A, brings movable plate 92B toward contact with stationary plate 92A. Flange 102 prevents further downward or Z-direction movement of movable yoke 92B such that further movement along trajectory t tends to pushe movable yoke 92B toward stationary yoke 92A. Links 94A and 94B, however, prevent yoke 92B from moving any closer to yoke 92A due to their engagement with screws 95A and 95B. Thus, links 94A and 94B are put into compression between screws 95A and 95B by the force pushing movable yoke 92B toward yoke 92A, the force actuating extruder 44A. As such, hinge distance $d_{H(X,Y)}$ shortens so that movable yoke 92B cannot become any closer to stationary plate 92A, thus fixing the distance $d_{(X,Y)}$ between nozzles 68A and 68B (FIG. 4). The widths w of links 94A and 94B, and the heights h of yokes 92A and 92B determine the mode through which yokes 92A and 92B will engage. For example, links 94A and 94B must be sized wide enough to allow jack assembly 90 to translate movable extruder 44A from the build state to the support state, and the heights of yokes 92A and 92B must be selected to ensure that flange 106 will engage stationary plate 92A. For example, in one embodiment, the width w of links 94A and 94B is selected to be the length of the hypotenuse of a right triangle having sides with lengths equaling hinge distances $d_{H(X,Y)}$ and $d_{H(Z)}$. Yokes 92A and 92B, then, must have heights h that enables flange 106 to engage yoke 92A.

Hinge mechanism 54 also assists in limiting movement of yoke 92B in the (X, Y) plane such that angle ∅ (FIG. 3C) is inhibited from changing. For example, links 94A and 94B inhibit movable yoke 92B from translating in the Y-direction by the use of right angles and shoulder screws for fasteners 95A and 95B. Through the use of high precision, post-manufacturing machining, or high-precision manufacturing, yokes 92A and 92B, and links 94A and 94B can be fabricated to a precise level such that tolerance stack-ups are within an acceptable range, such as approximately +/−0.002 inches (~0.051 mm). Fasteners 95A and 95B comprise shoulder screws that are tightly secured to yokes 92A and 92B while also permitting links 94A and 94B to pivot. In other embodiments, in lieu of expensive machining and manufacturing processes, hinge mechanism 54 is manually shimmed to ensure that angle ∅ is the same in heads 12A and 12B (FIG. 2), i.e. that movable extruders 44A and 44B are positioned similarly with respect to stationary extruders 42A and 42B in the (X, Y) plane. Alternatively, angle bracket 82B can be rotated on its connection with movable extruder block 50B (FIG. 3B) to adjust the placement of back plate 84B in the Y-direction and angle ∅.

The specific lengths of distances $d_{H(X,Y)}$ and $d_{H(Z)}$, height h and width w need not be exactly predetermined, as is it is more important that yokes 92A and 92B, and more importantly nozzles 68A and 68B, become fixed in some known spatial relationship so that positions of platen 22 and gantry 20 can be adjusted accordingly, rather than for nozzles 68A and 68B to be fixed in some specific relationship. For example, in another more simpler design, which is combined with various shimming procedures, hinge mechanism 54 is substituted with a plate that is fixed to stationary extruder 42A and that is wide enough to include a pair of bores that are set at a fixed distance for receiving extrusion tubes 64A and 64B (FIG. 3A). Movable liquefier tube 64B would be inserted and withdrawn from one of the bores as movable extruder 44A is toggled between the build and support states. In such an embodiment, however, movable liquefier tube 64B needs to be precisely aligned with the fixed bore. Additionally, steps must be taken to prevent extrusion material from accumulating on the fixed plate. In another embodiment, other double action hinges can be used, as is shown in FIG. 8.

Figure 8:
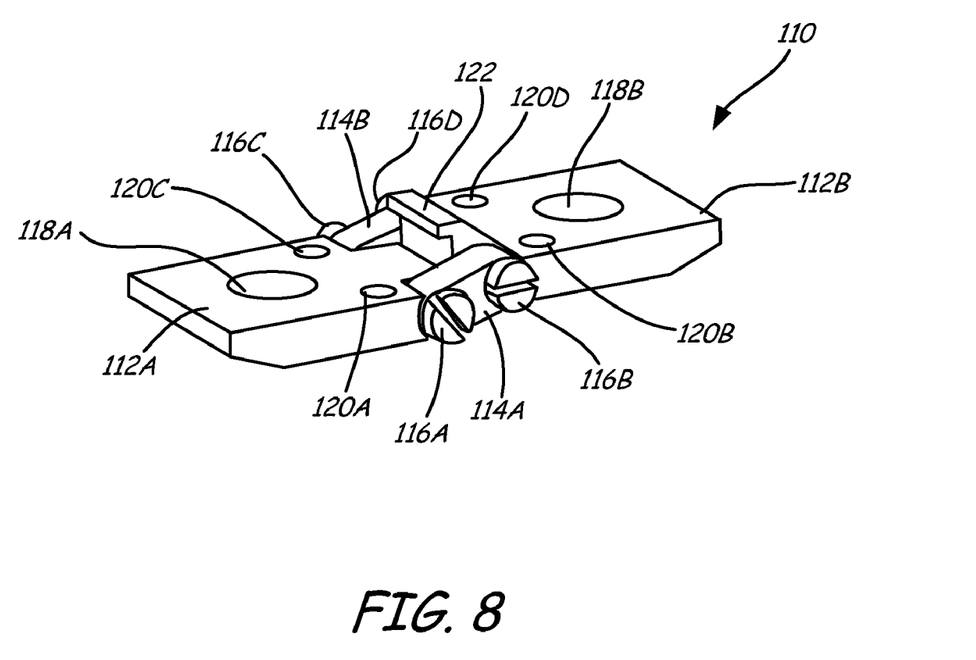
FIG. 8 is a perspective view of a second embodiment of a hinge mechanism for connecting stationary and movable extruders in a dual extruder head assembly.

FIG. 8 is a perspective view of hinge mechanism 110 for connecting stationary and movable extruders in a dual extruder head assembly. Hinge mechanism 110 includes first yoke 112A, second yoke 112B, link 114A, link 114B, fasteners 116A-116D, nozzle bores 118A and 118B, fastening bores 120A-120D, and interference feature 122. Hinge mechanism 110 is similar to hinge mechanism 54 in that yokes 112A and 112B are connected by links 114A and 114B to form a dual hinge mechanism that permits one of the yokes to be fixed, while the other is permitted to translate in the Z-direction parallel to platen 22 (FIG. 1). Second yoke 112B also includes interference feature 122 similar to that of interference feature 96 that inhibits Z-direction movement of second yoke 112B. Links 114A and 114B also permit second yoke 112B to rotate about fasteners 116A-116D such that second yoke 112B is able to abut first yoke 112A and be inhibited from moving in the X-direction. Additionally, yokes 112A and 112B, links 114A and 114B and fasteners 116A-116D can be precision manufactured and assembled to limit angle $\emptyset$ and movement of second yoke 112B in the Y-direction. Thus, hinge mechanism 110 functions in a similar manner as hinge mechanism 54 to position a movable extruder into a know spatial relationship with respect to a stationary extruder. Hinge mechanism 110, however, includes features that permit use with different types of extruders. For example, yokes 112A and 112B do not include nozzle pockets, but rather are configured to be abutted adjacent bottom surfaces of extruders such that extrusion nozzles are permitted to extend through bores 118A and 118B. As, such yokes 112A and 112B include fastening bores 120A-120D that extend through yokes 112A and 112B in the Z-direction. Furthermore, nozzle bores 118A and 118B comprise bores having complete three-hundred-sixty degree perimeters such that bores 118A and 118B completely surround extrusion nozzles to provide another degree of immobility.

Thus, using pantograph assemblies that include multiple, dual tip deposition heads and hinge mechanisms of the present invention, extrusion based layered deposition systems are able to manufacture multiple replica objects that achieve a high degree of similarity.

Although the present invention has been described with reference to preferred embodiments, workers skilled in the art will recognize that changes may be made in form and detail without departing from the spirit and scope of the invention.

The invention claimed is:

1. A digital manufacturing system for producing first and second replica three-dimensional objects, the system comprising:
   a platen defining a planar workspace upon which the first and second three-dimensional objects are produced;
   a gantry defining a planar headspace disposed parallel to the workspace;
   a pantograph extrusion head system mounted to the gantry for movement in the headspace; and
   first and second sets of extruders connected to the pantograph extrusion head system and configured to deposit extrusion material on the workspace to build the first and second three-dimensional objects, respectively, each set comprising:
      a first extruder mounted to the extrusion head system;
      a second extruder mounted to the extrusion head system so as to be actuatable relative to the first extruder from a first to a second position; and
      a flexible linkage connecting the second extruder to the first extruder;
   wherein the flexible linkages position the second extruders in approximately equal known spatial relationships to the first extruders in the second positions.

2. The digital manufacturing system of claim 1 wherein:
   the workspace is spaced from the headspace in a Z-direction;
   the gantry further comprises:
      an X-bridge comprising first and second X-rails extending in an X-direction orthogonal to the Z-direction; and
      a Y-bridge comprising first and second Y-rails extending in a Y-direction between the X-rails orthogonal to the X-direction and the Z-direction;
   the pantograph extrusion head system is mounted to the Y-rails for movement in an X-Y plane on the gantry;
   the second extruder is actuatable in the Z-direction; and
   the flexible linkage restricts movement of the second extruder in the Z-direction and the X-direction.

3. The digital manufacturing system of claim 2 and further comprising a controller for commanding and coordinating movement of the pantograph extrusion head system in the X-Y plane and movement of the second extruders in the Z-direction.

4. The digital manufacturing system of claim 3 wherein the pantograph extrusion head system comprises:
   a dual deposition head body connected to the Y-bridge of the gantry; and
   an umbilical system comprising a cable for electronically connecting the dual deposition head to the controller;
   wherein the first and second sets of extruders are connected to the dual deposition head body such that movement of the dual deposition head body as commanded by the controller coordinates movement of the first and second sets of extruders in the X-Y plane.

5. The digital manufacturing system of claim 3 wherein the pantograph extrusion head system comprises:
   a first deposition head connected to the Y-bridge and having the first set of extruders;
   a second deposition head connected to the Y-bridge and having the second set of extruders; and
   first and second umbilical systems each comprising a cable for electronically connecting the first and second deposition heads to the controller, respectively.

6. The digital manufacturing system of claim 5 wherein movements of the first deposition head and the second deposition head in the X-Y plane are independently commanded by the controller.

7. The digital manufacturing system of claim 5 and further comprising:
   a pantograph connector linking the first extrusion head to the second extrusion head;
   wherein movement of the first extrusion head as commanded by the controller is replicated by the second extrusion head through the pantograph connector.

8. The digital manufacturing system of claim 7 wherein the pantograph connector is removable from the first and second deposition heads such that the second deposition head can be parked on the gantry and the first deposition head can be commanded by the controller to produce a single three dimensional object.

9. The digital manufacturing system of claim 8 and further comprising a deposition material feed system configured to alternately direct a filament to each extruder in the first and second sets of extruders, or a pair of filaments to the first and second extruders in the first set of extruders.

10. The digital manufacturing system of claim 2 wherein the flexible linkages of the first and second sets of extruders each comprise:
   a first plate for connecting to the first extruder, the first plate comprising a first extruder nozzle bore;
   a second plate for connecting to the second extruder, the second plate comprising a second extruder nozzle bore; and
   a hinge connecting the first plate with the second plate such that the second plate is permitted to translate in the Z-direction.

11. The digital manufacturing system of claim 10 wherein the hinge comprises a double action hinge.

12. The digital manufacturing system of claim 10 wherein the hinge comprises:
   a first link pinned to the first plate along a first axis and the second plate along a second axis; and
   a second link pinned to the first plate along the first axis and the second plate along the second axis;
   wherein the links rotate to bring the second plate into contact with the first plate in the second position such that the distance between the first extruder nozzle bore and the second extruder nozzle bore in the X, Y plane is stabilized.

13. The digital manufacturing system of claim 10 and further comprising an interference feature projecting from the second plate to limit translation of the second plate in the Z-direction.

14. A deposition head for use in an extrusion based layered deposition system, the deposition head comprising:
   a head body configured to engage a gantry system of the extrusion based layered deposition system;
   a first extruder mounted to the extrusion head body, the first extruder comprising a first extrusion nozzle;
   a second extruder mounted to the extrusion head body so as to be actuatable between first and second positions, the second extruder comprising a second extrusion nozzle; and
   a hinge mechanism connecting the second extrusion nozzle with the first extrusion nozzle to limit two-dimensional movement of the second extruder in the second position such that the second extruder is positioned in a known spatial relationship to the first extruder.

15. The deposition head of claim 14 wherein the hinge mechanism inhibits vertical and lateral displacement between the first extruder and the second extruder in the second position.

16. The deposition head of claim 15 wherein:
   the head body further comprises:
      an actuator for actuating the second extruder between the first and second positions;
      first and second feed systems for providing extrusion material to the first and second extruders; and
      an upper pivoting connector connecting the first extruder to the second extruder;
   the first extruder further comprises:
      a first extrusion tube for receiving extrusion material from the first feed system; and
      a first extrusion heater for liquefying the extrusion material in the first extrusion tube;
      wherein first extrusion nozzle is configured to extrude the liquefied extrusion material from the first extrusion tube;
   the second extruder further comprises:
      a second extrusion tube for receiving extrusion material from the second feed system; and
      a second extrusion heater for liquefying the extrusion material in the second extrusion tube;
      wherein the second nozzle is configured to extrude the liquefied extrusion material from the second extrusion tube; and
   wherein the hinge mechanism connects the first extrusion nozzle with the second extrusion nozzle.

17. The deposition head of claim 16 wherein the hinge mechanism comprises:
   a first tip yoke for connecting to the first extruder, the first tip yoke comprising a first nozzle bore for receiving the first extrusion nozzle;
   a second tip yoke for connecting to the second extruder, the second tip yoke comprising a second nozzle bore for receiving the second extrusion nozzle; and
   a linkage connecting the first tip yoke with the second tip yoke such that the second tip yoke is permitted to translate with the second extruder while remaining approximately parallel to the first tip yoke.

18. The deposition head of claim 17 wherein the linkage comprises:
   a first link pinned to the first tip yoke along a first axis and the second tip yoke along a second axis;
   a second link pinned to the first tip yoke along the first axis and the second tip yoke along the second axis; and
   wherein the links rotate to bring the second tip yoke into contact with the first tip yoke in the second position such that a distance between the first nozzle bore and the second nozzle bore is inhibited from decreasing.

19. The deposition head of claim 18 and further comprising an interference feature projecting from the second tip yoke to limit actuation of the second extruder and the second tip yoke in the second position.

20. A fused deposition manufacturing system for producing replica three-dimensional objects, the system comprising:
   a platen defining a workspace upon which the three-dimensional objects are produced;
   a gantry system defining a planar headspace disposed approximately parallel to the workspace;
   a first extrusion head suspended from the gantry system, the first extrusion head comprising:
      a first material extruder fixedly attached to the first extrusion head; and
      a second material extruder adjustably attached to the first extrusion head so as to be translatable perpendicular to the planar headspace;
   a control system connected to the first extrusion head for manipulating the position of the first extrusion head on the gantry within the planar headspace;
   a second extrusion head suspended from the gantry system, the second extrusion head comprising:
      a third material extruder fixedly attached to the second extrusion head; and
      a fourth material extruder adjustably attached to the second extrusion head so as to be translatable perpendicular to the planar headspace;
   a rigid connection linking the second extrusion head to the first extrusion head such that movement of the first extrusion head in the headspace is mimicked by the second extrusion head; and
   first and second linkages connecting the first material extruder to the second material extruder, and the third material extruder to the fourth material extruder, respectively, to duplicate spatial adjustment of the second and fourth extruder with respect to the first and third extruders, respectively.

* * * * *